United States Patent

Krehbiel, Sr. et al.

[15] 3,686,625

[45] Aug. 22, 1972

[54] SOLDER RESIST

[72] Inventors: John H. Krehbiel, Sr.; Kerry M. Krafthefer, both of Downers Grove, Ill.

[73] Assignee: Molex Products Company, Downers Grove, Ill.

[22] Filed: Dec. 10, 1969

[21] Appl. No.: 883,859

[52] U.S. Cl. ...........339/275 B, 174/68.5, 339/278 C

[51] Int. Cl. ...............................................H01r 9/06

[58] Field of Search .......339/17, 275, 278; 174/68.5, 174/84

[56] References Cited

UNITED STATES PATENTS

| | | | |
|---|---|---|---|
| 3,163,485 | 12/1964 | Kruitwagen et al. | 339/276 T |
| 2,711,524 | 6/1955 | Beaver | 339/275 T |
| 3,163,709 | 12/1964 | Fox | 174/68.5 |
| 3,230,297 | 1/1966 | Means | 174/68.5 |
| 3,249,910 | 5/1966 | Venn et al. | 339/275 B |
| 3,268,653 | 8/1966 | McNutt | 174/68.5 |
| 3,525,972 | 8/1970 | Asick et al. | 339/64 |

*Primary Examiner*—Joseph H. McGlynn

*Attorney*—Olson, Trexler, Wolters & Bushnell

[57] ABSTRACT

A solder resist, i.e., a material that is not wet by and hence not adhered to by solder is applied to a portion of a sheet metal blank. The sheet metal blank is stamped and formed to produce a substantially cylindrical female terminal for receipt of a plug-in male terminal as of a solid state device. The terminal is flow soldered in place in a printed circuit board, and the solder resist prevents solder from adhering in areas where it would adversely affect operability of the female terminal.

14 Claims, 18 Drawing Figures

Inventors
John H. Krehbiel
Kerry M. Krafthefer
By: Olson, Trexler, Wolters & Bushnell Att'ys.

Inventors
John H. Krehbiel
Kerry M. Krafthefer
By: Olson, Trexler, Wolters & Bushnell Attys.

Inventors
John H. Krehbiel
Kerry M. Krafthefer
By: Olson, Trexler, Wolters & Bushnell attys.

SOLDER RESIST

BACKGROUND OF THE INVENTION

The present invention relates generally to printed circuit board connectors and with solder resists used in connection with such connectors.

Printed circuit boards, as are well known, are widely used in industry, and comprise an insulating board or card with printed circuit wiring, typically of copper, thereon. Holes are provided through the board and through the printed circuit wiring in appropriate positions, and connections of electrical components are made thereto by inserting the terminal wires through the holes and soldering the wires in place in electrical engagement with the printed circuit wiring. Typically, the soldering is effected by the flow soldering process, whereby many soldered joints are made simultaneously. Removal of electrical components for replacement or repair thereof has proved difficult, particularly in the case of integrated circuit devices or other solid state devices having a plurality of terminals, in that it is necessary simultaneously to desolder many terminals, and to remove the device. Desoldering is further complicated by the fact that printed circuit boards are often used in locations where it is difficult to reach them with a soldering iron, and in that various solid state devices are readily damaged severely by excess heat.

Accordingly, it has been proposed heretofore to provide female terminals that can be soldered in place in a printed circuit board, for detachable receipt of the male terminals of an electrical component. One such satisfactory terminal is shown in the application of Stanley V. Horecky and Cletus McDonough filed Feb. 13, 1969 under Ser. No. 798,936 for "Printed Circuit Board Lead Wire Receptacle." The terminal referred to is stamped and formed from flat sheet metal stock, and results in a generally tubular female terminal. Problems have been encountered in soldering such terminals in place in that occasionally a small crevice or opening is left in a terminal through which solder enters and moves by capillary attraction into such position that it may block entrance of a male terminal or lead. This requires removal of such solder, often a very difficult operation, or sometimes complete replacement of the terminal, all resulting in untoward expense.

SUMMARY AND OBJECTS OF THE INVENTION

In accordance with the present invention a solder resist, either of a metallic or organic nature, is applied to a sheet metal blank. The blank is punched and formed in automatic machinery and ultimately formed into generally tubular female terminals which are soldered in place in printed circuit boards. The solder resist is in an appropriate place in the final terminal to preclude wetting of the metal by the solder in improper locations, and thereby to avoid capillary movement of the solder to a position where it could interfere with the function of the female terminal.

Thus, it is an object of the present invention to provide an improved printed circuit board female terminal wherein solder is maintained away from undesired areas.

It is a further object of the present invention to provide an improved sheet metal blank having a solder resist thereon for the formation of electrical terminals.

It is a further object of the present invention to provide means and methods of manufacturing sheet metal blanks having a solder resist thereon.

DESCRIPTION OF THE DRAWINGS

Other objects and advantages of the present invention and structure for its realization will be understood from the following specification when taken in connection with the accompanying drawings wherein.

DETAILED DESCRIPTION

Figures 1, 2, 3, 4, 5, 6:
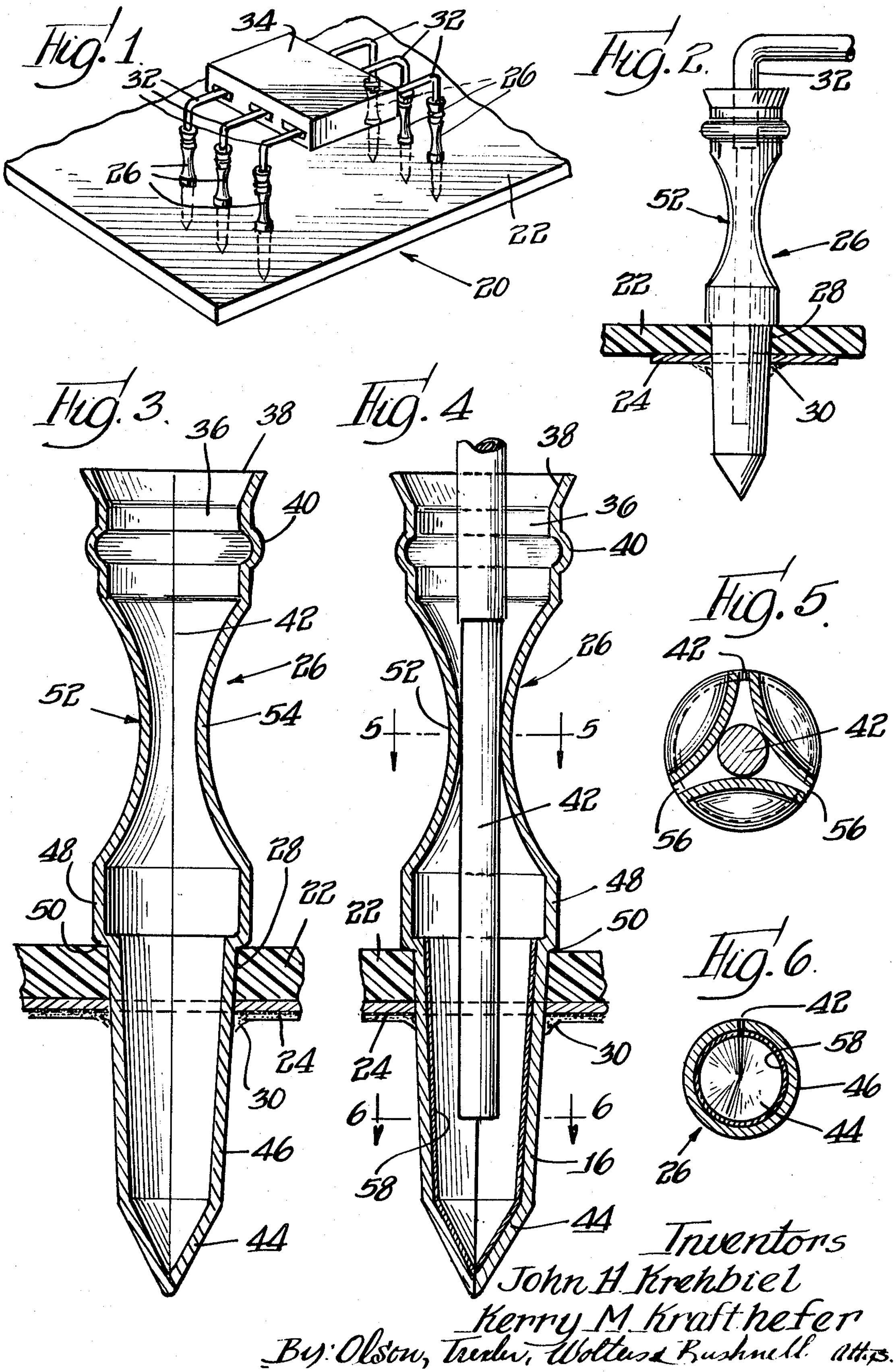
FIG. 1 is a perspective view of a multi-lead electrical component or element, such as a solid state device, connected to female printed circuit board terminals constructed in accordance with the present invention.
FIG. 2 is an enlarged view through one such female terminal, the corresponding printed circuit board being shown in cross-section.
FIG. 3 is a considerably enlarged longitudinal sectional view through such a terminal as constructed in accordance with the aforesaid Horecky and McDonough application.
FIG. 4 is a view similar to FIG. 3 showing the terminal as improved with the addition of a solder resist.
FIG. 5 is a cross-sectional view through the terminal of FIG. 4 taken substantially along the line 5—5 therein.
FIG. 6 is a cross-sectional view through the terminal of FIG. 4 taken substantially along the line 6—6 therein.

Turning now to the drawings in greater detail, and first to FIGS. 1–3, there will be seen a printed circuit board 20 including the usual insulating board or card 22 with printed circuit wiring on one face (illustratively the lower face) thereof, and with a plurality of female electrical terminals 26 inserted in holes 28 through the printed circuit board and soldered at 30 to the printed circuit wiring 24. The female terminals 26 receive the male terminals 32 of an electrical component or element 34, for example an integrated circuit. The number of female terminals 26 is determined by the number of male terminals 32, and this number, of course, depends on the electrical characteristics of the element or component 34.

The terminal 26 is formed from a section of planar sheet metal, and is formed into a generally tubular configuration, having an open upper end 36 flaring outwardly at 38 for receipt of the male terminal 32. A stiffening rib 40 is provided adjacent the upper end, and as will be apparent, there is a seam 42 extending from the top to the bottom or tip 44 the latter being of conical or pyramidal shape. A body 46 extends upwardly from the tip 44 to an enlarged central portion 48 joining the body at a shoulder 50 limiting penetration of a terminal 26 into the hole 28 in the printed circuit board.

Intermediate the upper portion 36 of the terminal and the enlarged central portion 48 the terminal is bowed in at 52 in the form of three resilient strips 54 formed among the seam 42 and two additional slits 56 (see FIG. 5). The resilient strips of the bowed section 52 grip the male terminal as will be apparent.

The terminal as just described is the same terminal shown in FIGS. 11–17 of the aforesaid Horecky and McDonough application. It has been found in general that the terminal is quite satisfactory. However, occasionally the seam 42 through the body 46 and tip 44 does not completely close up during the process of manufacture. When the seam is open beyond a certain degree, solder will occasionally enter the interior of the body or tip, and will adhere to the interior side wall forming an obstruction to the entry of the male terminal which occasionally is sufficiently serious that the female terminal must be removed and replaced. This is at best a bother and disrupts production line activities, adding to the overall cost.

Accordingly, we have improved the present terminal as will be seen in FIGS. 4 and 6 by applying a solder resist 58 to the inner surface of the body 46 and tip 44. If any solder enters the seam 42 (which would have to be in the body or tip, since solder is applied only below the board 22), the solder will not adhere to the resist 58, but will not enter the terminal through the seam at all. The non-wetting of the resist by the solder acts as a barrier against entry of the solder. In accordance with the principles of the present invention the resist is applied before the terminal is rolled into the tubular form shown, and it may be metallic or it may be organic, or it may be provided by controlled oxidation of the surface of the metal.

Figures 7, 8, 9, 10, 11, 12, 13:
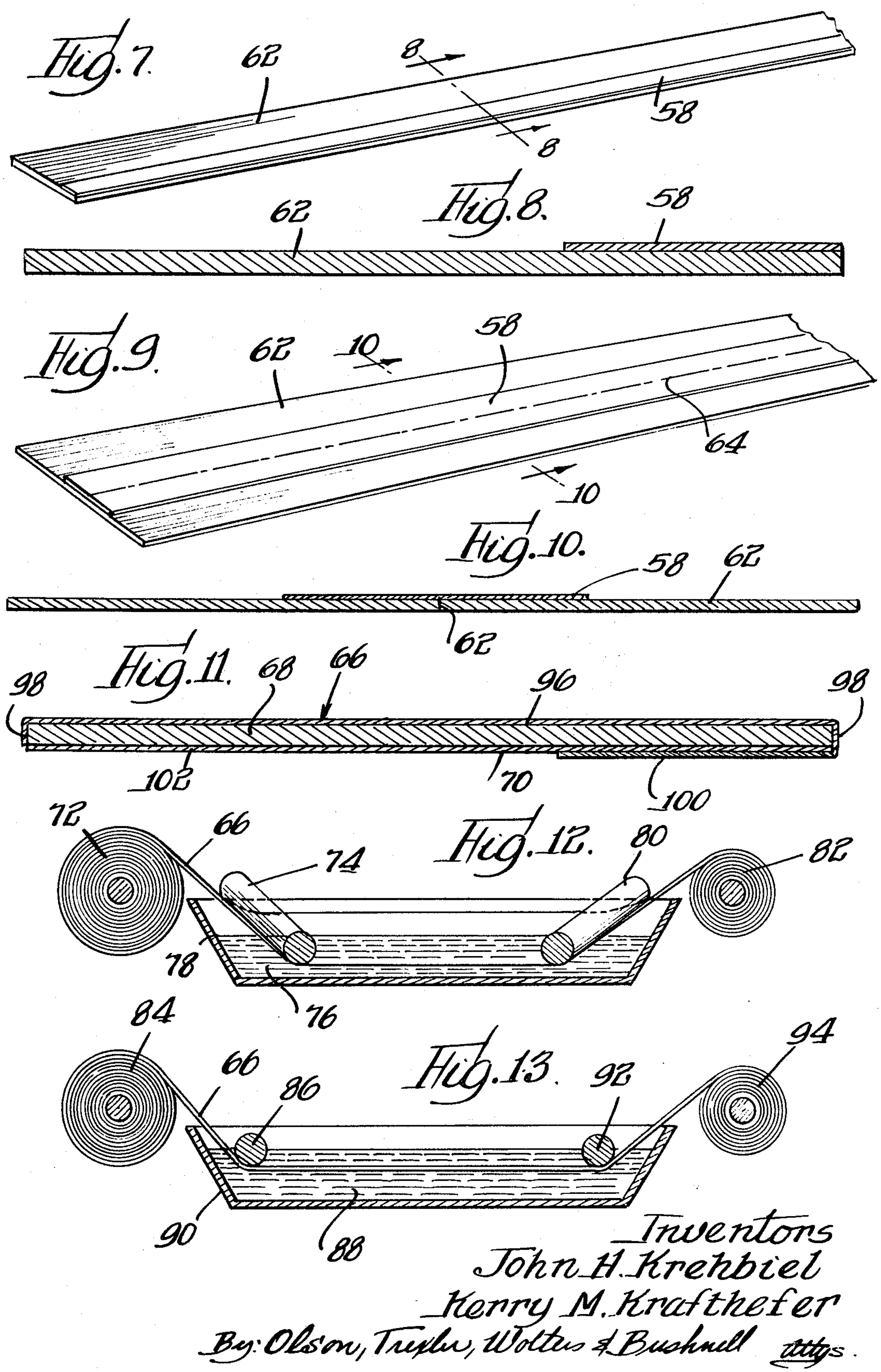
FIG. 7 is a perspective view of a metal blank having a metallic solder resist thereon in accordance with the present invention.
FIG. 8 is a cross-sectional view therethrough as taken substantially along the line 8—8 in FIG. 7.
FIG. 9 is a perspective view generally similar to FIG. 7 showing a modification of the blank with the solder resist thereon.
FIG. 10 is a cross-sectional view taken substantially along the line 10—10 in FIG. 9.
FIG. 11 is a cross-sectional view showing aluminum applied to one face of a brass metal sheet with the brass metal sheet and part of the aluminum having a tin plate applied thereto for electrical conduction or for soldering, and part of the aluminum being exposed as a solder resist.
FIG. 12 is a somewhat schematic longitudinal sectional view showing the aluminum plated brass plate being acid etched for adherence of the tin plate.
FIG. 13 is a view somewhat similar to FIG. 12 showing a hot tin dip to apply the tin.

Application of the solder resist 58 will be understood in part with reference to FIGS. 7 and 8. A strip of brass 62 which has excellent soldering characteristics, and which may be improved by tin plating, is provided with a resist 58 comprising a strip of aluminum. The aluminum strip is quite thin, since it does not provide any structural strength, but simply prevents adherence of solder. The aluminum strip is placed in contact with the brass strip and the two are rolled together under rather heavy pressure which causes the aluminum strip thereafter to adhere to the brass strip with great tenacity. As is known, the bond is a mechanical one. The exposed face of the aluminum oxidizes rapidly, if it is not already oxidized, and as is well known it is well nigh impossible to solder oxidized aluminum. Hence, when the brass strip 62 with the aluminum strip 58 adhered thereto is formed into a terminal, solder will not adhere in the area covered by the aluminum strip 58. As will be apparent the aluminum may be applied by alternative methods including electrodepositing, brushing, impregnating or selectively metalizing.

Alternative to the use of aluminum, chromium also makes an excellent solder resist. Rather than being rolled on for adherence by a mechanical bond, a very thin layer of chromium may be flashed on the brass, either completely over one face, or with the face masked so that only a part of the face of the brass strip is flashed with chromium.

A somewhat more economical process is illustrated in FIGS. 9 and 10, wherein a somewhat wider strip of aluminum 58 is rolled onto a wider brass strip 62, with the center lines of the two strips coinciding at 64. The composite strip then is slit or otherwise cut along the center line 62 to provide two brass blank strips with relatively narrow strips of aluminum solder resist along one edge of each.

An alternative process is illustrated in FIGS. 11–13. A composite strip 66 comprising a base 68 of brass sheet has a thin sheet of aluminum 70 adhered thereto in accordance with the process or processes heretofore noted. In the present instance the aluminum sheet is the same width as the brass sheet.

As will be seen in FIG. 12, the composite strip 66 may be supplied from a roll 72, and is passed under a diagonal roller 74 into an acid or other suitable etchant bath 76 in a suitable tank 78. Due to the diagonal disposition of the entering roller 74, and of an outlet roller 80 leading to a take up roll 82, only a portion of the width of the composite strip 66 is etched.

Subsequently, the partially etched composite strip 66 is fed from an input roller 84 under a horizontal roller 86 through a hot tin bath 88 and a suitable vessel 90, the composite strip 66 passing under an outlet horizontal roller 92 onto a take up roll 94. The hot tin bath 88 comprises molten tin, as is known, heated by any suitable agency.

As will be seen with reference to FIG. 11, the tin adheres at 96 to the face of the brass sheet 68, and also to the ends thereof at 98, and to the etched portion of the aluminum sheet 70 at 100. However, the tin does not adhere to the non-etched portion of the aluminum sheet, whereby this portion remains as a solder resist 102. The tin plate functions as a conductor over the remainder of the surface of the metal blank or strip.

Figure 14:
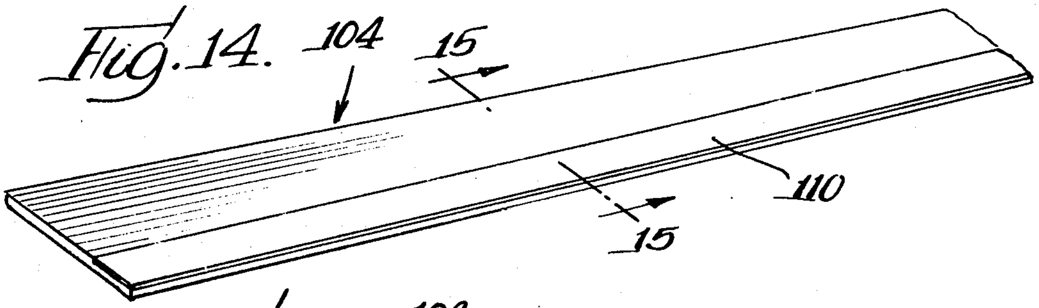
FIG. 14 is a perspective view generally similar to FIG. 7 showing a tinned brass plate with an organic solder resist thereon.
Figure 15:
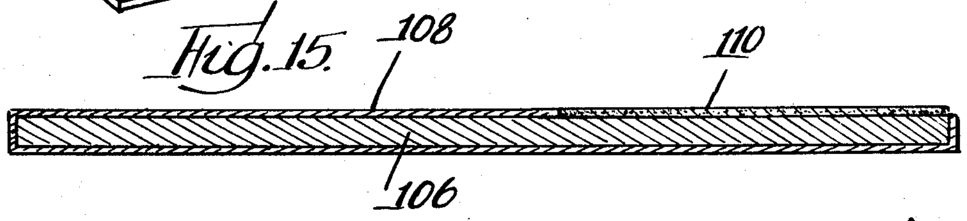
FIG. 15 is a cross-sectional view taken substantially along the line 15—15 of FIG. 14.

Turning now to FIG. 14, there is shown a strip 104 of brass 106 plated with tin 108. A strip of organic material 110 is applied prior to tinning to one face of the brass strip along one edge portion, forming an organic resist. An epoxy resin enamel is suggested as the organic resist 110, and suitable examples are known in the art. It may be applied by painting it on, as by spray or with or through an orifice, by dipping, or by any other suitable means.

Figure 16:
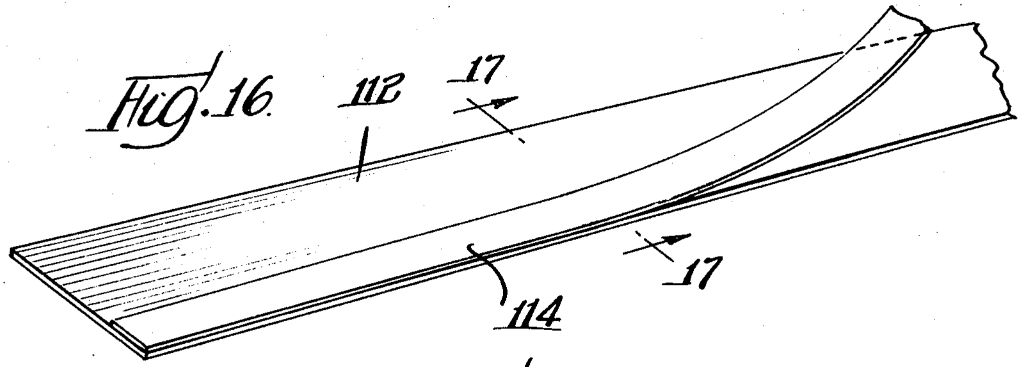
FIG. 16 is a perspective view generally similar to FIG. 7 showing an adhesive tape applied to a metal base as a solder resist.
Figure 17:
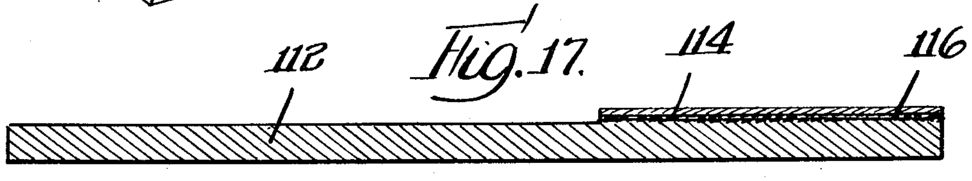
FIG. 17 is a cross-sectional view taken substantially along the line 17—17 in FIG. 16; and, FIG. 18 is a layout view showing the blanking and formation of terminals in accordance with the present invention.

Another example will be seen with reference to FIGS. 16 and 17 wherein there is shown a brass strip 112 which optionally can be overall tin plated. A tape 114 is applied along one edge of the face of the brass strip 112 by means of an adhesive 116. As will be understood, this can be a pressure sensitive adhesive applied to the tape during the course of manufacture. The tape should be heat resistant, and the material sold commercially as Teflon (polytetrafluoroethylene) is suggested as a satisfactory material for the tape. Since the terminals which are to be manufactured from the blank material are intended normally to be soldered only once, some degree of damage to the tape during the initial soldering operation is of no consequence.

With continued reference to FIGS. 16 and 17, it is contemplated that the tape could be an aluminum tape applied with an adhesive, with the aluminum serving as a resist as discussed heretofore.

Figure 18:
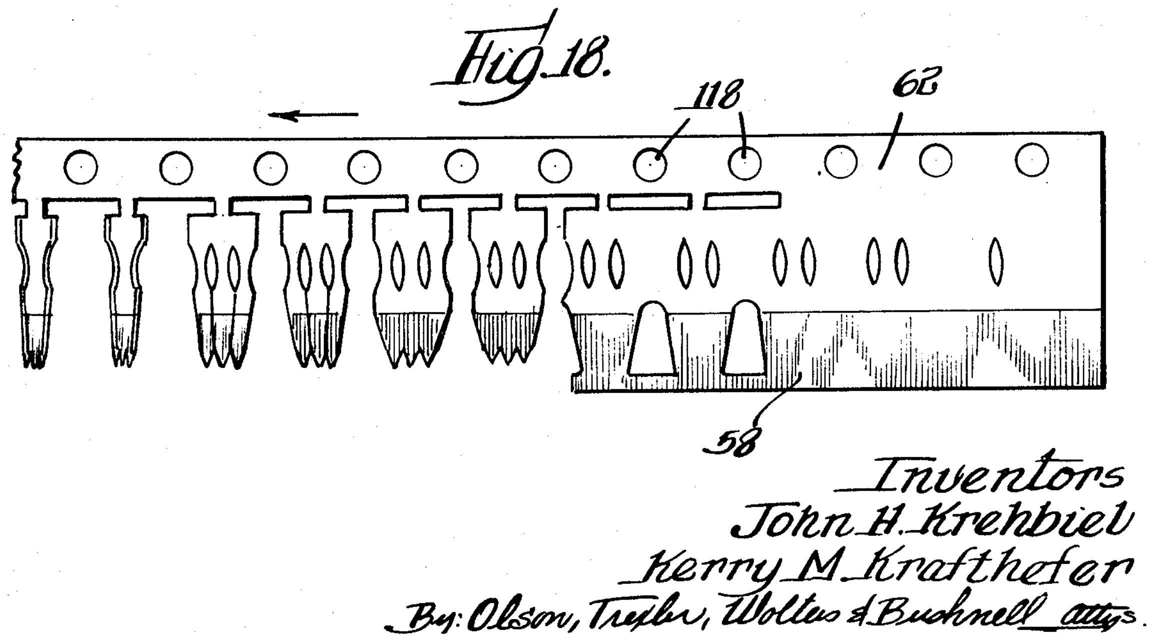

Reference should be had to FIG. 18 for a summary of the formation of the terminal 26, and it will be seen that the strip, for example a brass strip 62 with the aluminum resist 58 thereon, is provided with spaced holes 118 for feeding of the strip from right to left as shown in FIG. 18. It is not believed that it is essential at the present time to go into the specific steps of manufacture, since the punching away of various sections of metal will be self-evident, followed by rolling of the metal from the initial plane thereof as shown in the left two positions in FIG. 18 to form the final tubular female terminal with the solder resist 58 on the inside of the body and tip.

In addition to the foregoing the solder resist, such as the resist 58 in FIG. 7, can be formed by controlled oxidation of the desired portion of the appropriate surface of the base strip.

Although the invention has been described with regard to soldering and a solder resist, it will be apparent that the principles of the invention are applicable to selective plating as with a precious or semi-precious metal that will in essence be repelled by the resist, and the word "solder" in the claims should be construed with this in mind. In general, the following claims should be construed so as to cover the true spirit and scope of the invention as disclosed herein.

The invention is claimed as follows:

1. A terminal for printed circuit boards comprising a hollow body having a wall with inner and outer surfaces and having a discontinuity in said wall, said body being adapted to be inserted through a hole in a printed circuit board including printed circuit wiring thereon and soldered in place, an upper open portion integral with said body and adapted detachable to receive a complementary terminal which when in the body is surrounded by said inner surface, and a solder resist on said inner surface at least in the region that is adapted to surround said complementary terminal to prevent at least in said region the adherence of solder that may flow through said discontinuity when the terminal is soldered in place.

2. A terminal for printed circuit boards comprising a hollow body of resilient sheet metal in substantially tubular form and having inner and outer surfaces and having a seam therein, said body being adapted to be inserted through a hole in a printed circuit board including printed circuit wiring thereon and soldered in place, an open upper portion integral with said body and adapted detachable to receive a complementary terminal, and a solder resist on said inner surface in the region adapted to surround the complementary terminal to prevent the adherence of solder thereto that may flow through said seam when the terminal is soldered in place.

3. A terminal as set forth in claim 2 wherein the seam in the body comprises a substantially longitudinal seam.

4. A terminal for printed circuit boards comprising a hollow body of resilient sheet metal in substantially tubular form and having inner and outer surfaces and having a seam therein, said body being adapted to be inserted through a hole in a printed circuit board including printed circuit wiring thereon and soldered in place, an open upper portion integral with said body and adapted detachably to receive a complementary terminal, and a solder resist on a surface of said body, said solder resist being applied to said sheet metal in generally flat configuration and being deformed with said sheet metal into said substantially tubular configuration.

5. A terminal as set forth in claim 4 wherein the resist comprises an organic resist.

6. A terminal as set forth in claim 4 wherein the resist comprises an oxide.

7. A terminal as set forth in claim 4 wherein the resist comprises a metal resist.

8. A terminal as set forth in claim 7 wherein the metal resist comprises a thin sheet metal.

9. A terminal as set forth in claim 7 wherein the resist comprises a metallic flash on the sheet metal.

10. A workpiece adapted to be formed into a female terminal with a portion to surround an inserted male terminal; and comprising a sheet of resilient, deformable metal of predetermined thickness, and a solder resist on the part of said metal sheet substantially extending from one longitudinal margin thereof over a fractional part of the width thereof to present the solder resist in the area of the female terminal which is to surround an inserted male terminal.

11. A work piece as set forth in claim 10 wherein the solder resist comprises a metal solder resist.

12. A work piece as set forth in claim 10 wherein the solder resist comprises an organic solder resist.

13. A workpiece according to claim 10 wherein the resist comprises a surface oxide.

14. A workpiece comprising a sheet of resilient deformable metal of predetermined thickness, a thinner solder resist on at least a part of one surface of said metal sheet, and further including an adhesive securing said solder resist on said metal sheet.

* * * * *